US012024159B2

United States Patent
Peters et al.

(10) Patent No.: US 12,024,159 B2
(45) Date of Patent: Jul. 2, 2024

(54) DEVICE AND METHOD FOR GENERATING A COMPRESSED NETWORK FROM A TRAINED NEURAL NETWORK

(71) Applicant: Robert Bosch GmbH, Stuttgart (DE)

(72) Inventors: Jorn Peters, Amsterdam (NL); Emiel Hoogeboom, Amsterdam (NL); Max Welling, Bussum (NL); Melih Kandemir, Stuttgart (DE); Karim Said Mahmoud Barsim, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 893 days.

(21) Appl. No.: 16/983,802

(22) Filed: Aug. 3, 2020

(65) Prior Publication Data

US 2021/0086753 A1 Mar. 25, 2021

(30) Foreign Application Priority Data

Sep. 19, 2019 (EP) .................................. 19198421

(51) Int. Cl.
*G06N 3/04* (2023.01)
*B60W 30/00* (2006.01)
*B60W 60/00* (2020.01)
*G06N 3/045* (2023.01)
*G06N 3/08* (2023.01)

(52) U.S. Cl.
CPC .......... *B60W 30/00* (2013.01); *B60W 60/001* (2020.02); *G06N 3/045* (2023.01); *G06N 3/08* (2013.01)

(58) Field of Classification Search
CPC .... B60W 30/00; B60W 60/001; G06N 3/045; G06N 3/08; G06N 3/082; G06F 18/214
See application file for complete search history.

(56) References Cited

U.S. PATENT DOCUMENTS

2020/0005146 A1* 1/2020 Son ......................... G06N 3/08
2020/0272905 A1* 8/2020 Saripalli ............... G06N 3/082

FOREIGN PATENT DOCUMENTS

WO 2018000309 A1 1/2018

OTHER PUBLICATIONS

Sung, W., Shin, S., & Hwang, K. (2015). Resiliency of deep neural networks under quantization. arXiv preprint arXiv:1511.06488. (Year: 2015).*

(Continued)

*Primary Examiner* — Alan Chen
(74) *Attorney, Agent, or Firm* — NORTON ROSE FULBRIGHT US LLP; Gerard A. Messina

(57) ABSTRACT

A device and a method for generating a compressed network from a trained neural network are provided. The method includes: a model generating a compressing map from first training data, the compressing map representing the impact of model components of the model to first output data in response to the first training data; generating a compressed network by compressing the trained neural network in accordance with the compressing map; the trained neural network generating trained network output data in response to second training data; the compressed network generating compressed network output data in response to the second training data; training the model by comparing the trained network output data with the compressed network output data.

11 Claims, 10 Drawing Sheets

(56) References Cited

OTHER PUBLICATIONS

Reddy, B., Kim, Y. H., Yun, S., Seo, C., & Jang, J. (2017). Real-time driver drowsiness detection for embedded system using model compression of deep neural networks. In Proceedings of the IEEE conference on computer vision and pattern recognition workshops (pp. 121-128). (Year: 2017).*

Ba, et al.: "Adaptive dropout for training deep neural networks", Proceedings of the 27th Annual Conference on Neural Information Processing Systems (NI PS' 13), Dec. 5, 2013 (Dec. 5, 2013), pp. 1-9, XP055193476.

Chandakkar, et al.: "Strategies for Re-Training a Pruned Neural Network in an Edge Computing Paradigm", 2017 IEEE 1st International Conference on Edge Computing (Edge), IEEE, , pp. 244-247, XP033151610.

Gordienko, et al.: "Adaptive Iterative Pruning for Accelerating Deep Neural Networks", 2019 XIth International Scientific and Practical Conference on Electronics and Information Technologies (ELIT), IEEE, pp. 173-178, XP033649931.

Han, et al.: "Deep Compression: Compressing Deep Neural Networks with Pruning, Trained Quantization and Huffmann Coding", Published as a conference paper at ICLR 2016, arxiv.org, pp. 1-14, XP055534891.

Ullrich, et al.: "Soft Weight-Sharing for Neural Network Compression", a conference paper at ICLR 2017, pp. 1-14, XP055672366.

Hinton et al., "Distilling the Knowledge in a Neural Network," Cornell University, 2015, pp. 1-9. https://arxiv.org/abs/1503.02531v1.

Bucila et al., "Model Compression," KDD Proceedings, 2006, pp. 1-7.

Chen et al., "You Look Twice: Gaternet for Dynamic Filter Selection in CNNS," Cornell University, 2019, pp. 1-10. https://arxiv:1811,11205v2.

Finn et al., "Model-Agnostic Meta-Learning for Fast Adaption of Deep Networks," International Conference on Machine Learning, 2017, pp. 1-13. https://arxiv:1703.03400v3.

* cited by examiner

DEVICE AND METHOD FOR GENERATING A COMPRESSED NETWORK FROM A TRAINED NEURAL NETWORK

CROSS REFERENCE

The present application claims the benefit under 35 U.S.C. § 119 of European Patent Application No. EP 19198421.0 filed on Sep. 19, 2019, which is expressly incorporated herein by reference in its entirety.

FIELD

Various embodiments of the present invention generally relate to a device and a method for generating a compressed network from a trained neural network.

BACKGROUND INFORMATION

By way of example, for autonomous driving, imaging sensors, such as camera sensors and/or video sensors, may be used to provide digital images of the surroundings of a vehicle. A neural network may be trained to process the digital images in various environments, such as busy cities, snowy mountains, or deserted plains, and the vehicle may be controlled depending on the situations illustrated in the digital images. Thus, the neural network is trained for various environments, situations, objects, contexts, etc. making the trained neural network computationally intensive. However, if the vehicle is in one environment, for example a city, the vehicle does not need to react to situations or objects the neural network was trained for in other environments, for example deserted plains. Thus, for example in real-time and safety-critical system, it is necessary to provide a model that is capable to generate a compressed network with low computational cost from the trained neural network for a specific environment.

Various neural networks are trained on large data sets to perform multiple tasks leading to a high computational cost of the trained neural network. For many applications, such as real-time applications or safety-critical applications, it may be necessary to provide a neural network with low computational cost. Furthermore, performing only some tasks of the multiple tasks may be required. Thus, it may be necessary to generate a compressed network from a trained neural network, wherein the compressed network is capable to perform some tasks (for example one task) of the multiple tasks with low computational cost.

In Hinton et al., "Distilling the Knowledge in a Neural Network," arXiv:1503.0253, 2015, a method for compressing a resource-heavy neural network to a resource-efficient neural network is described.

In Bucila et al., "Model Compression," KDD proceedings, 2006, a method for compressing a resource-heavy neural network to a resource-efficient neural network is described.

In Chen et al., "You Look Twice: GaterNet for Dynamic Filter Selection in CNNs," arXiv:1811,11205, 2019, a method for improving a neural network performance using a scaling mask is described.

In Finn et al., "Model-Agnostic Meta-Learning for Fast Adaption of Deep Networks," International Conference on Machine Learning, 2017, a meta learning approach for generalizing to unseen tasks is described.

SUMMARY

In accordance with the present invention, an example method and an example device enable a model to be trained to generate a compressed network from a trained neural network for performing a specific task of the trained neural network.

A model may be any kind of algorithm, which provides output data for input data. For example, a model may be a neural network.

The model may include a first model portion and a second model portion. Generating a compressing map may include the first model portion generating an impact map. The impact map may represent the impact of first model components for each first output datum of the first output data in response to the associated first training datum. Generating a compressing map may further include generating a combined impact map for the plurality of impact maps. Generating a compressing map may include the second model portion generating the compressing map from the combined impact map. Illustratively, an impact map may represent the importance or impact of a respective first model component to the first output datum in response to the first training datum. The features mentioned in this paragraph in combination with the first example provide a second example in accordance with the present invention.

Each first model component of the plurality of first model components may include a plurality of weights and a bias. The first model component may further include an activation function. The features mentioned in this paragraph in combination with the second example provide a third example in accordance with the present invention.

Each first model component of the plurality of first model components may further include a first model component output.

An impact map may include the plurality of first model component outputs for a first training datum of the first training data. The features mentioned in this paragraph in combination with the second example or the third example provide a fourth example in accordance with the present invention.

Training the model may include training the first model portion and/or training the second model portion. The first model portion and/or the second model portion may be trained by comparing the trained network output data with the compressed network output data. The features mentioned in this paragraph in combination with any one of the second example to the fourth example provide a fifth example in accordance with the present invention.

Generating the compressed network may include deleting network components from the trained neural network in accordance with the compressing map if a corresponding value in the compressing map meets a predefined criterion. The predefined criterion may be met if a corresponding value in the compressing map is below a predefined threshold value. The features mentioned in this paragraph in combination with any one of the first example to the fifth example provide a sixth example in accordance with the present invention.

Training the model may include training the model to increase the total compression. The total compression may be increased by reducing a sum of each value of the compression map. In other words, the plurality of values in the compression map may be added and the model may be trained to reduce the sum. The features mentioned in this paragraph in combination with any one of the first example to the sixth example provide a seventh example in accordance with the present invention.

Comparing the trained network output data with the compressed network output data may include determining a loss value by comparing each trained network output datum of the trained network output data with the associated compressed network output datum of the compressed network output data. A loss value of the plurality of loss values may be determined using a loss function. The loss function may be a cross-entropy loss function. The features mentioned in this paragraph in combination with the fifth example provide an eighth example in accordance with the present invention.

The method may further include determining a total loss value for the plurality of loss values. The total loss value may be determined by a sum of the plurality of loss values and a regularization term. The first model portion and the second model portion may be trained using the total loss value and back-propagation of the loss value gradients with respect to first model components. The regularization term may be any term that prefers sparse solutions. Thus, the regularization term has the effect that the trained neural network is distilled or compressed. In other words, the regularization term has the effect that an increased number of compressing factors of the compressing map have a value of "0" or a value close to "0". The features mentioned in this paragraph in combination with the eighth example provide a ninth example in accordance with the present invention.

The first model portion may include at least a part of the trained neural network. The first model components of the first model portion may correspond to trained network components of the trained neural network. The features mentioned in this paragraph in combination with any one of the second example to the ninth example provide a tenth example in accordance with the present invention.

The trained neural network may include a first part of trained network components and a second part of trained network components. The trained network components associated to the first part of trained network components may be different of the trained network components associated to the second part of trained network components. The first model components of the first model portion may correspond to the first part of the trained network components. The features mentioned in this paragraph in combination with the tenth example provide an eleventh example in accordance with the present invention.

The first part of the trained network components may provide intermediate output data for the first training data and the second part of the trained network components may provide the first output data for the intermediate output data. This has the effect that the first model components correspond initially, i.e., before training, to the first layers of the trained neural network, wherein the first layers of the trained neural network are important for analyzing the features of processed data. The features mentioned in this paragraph in combination with the eleventh example provide a twelfth example in accordance with the present invention.

An impact map may represent the impact of the trained network components to a first output datum of the first output data in response to the associated first training datum. The feature mentioned in this paragraph in combination with the eleventh example or the twelfth example provides a thirteenth example in accordance with the present invention.

The first output data may be generated by the trained neural network for the first training data. The feature mentioned in this paragraph in combination with the thirteenth example provides a fourteenth example in accordance with the present invention.

Generating a combined impact map for the plurality of impact maps may include a sum or a mean of the plurality of impact maps. The feature mentioned in this paragraph in combination with any one of the second example to the fourteenth example provides a fifteenth example in accordance with the present invention.

The trained neural network may be trained to provide first output data for first input data of a plurality of tasks. The compressed network may provide second output data for second input data of at least one task of the plurality of tasks. The features mentioned in this paragraph in combination with any one of the first example to the fifteenth example provide a sixteenth example in accordance with the present invention.

Generating a compressed network may include a multiplication of the compressing map and the trained neural network. The feature mentioned in this paragraph in combination with any one of the first example to the sixteenth example provides a seventeenth example in accordance with the present invention.

Each trained network component of a plurality of trained network components may include a plurality of weights and a bias. The trained network component may further include an activation function. The features mentioned in this paragraph in combination with any one of the first example to the seventeenth example provide an eighteenth example in accordance with the present invention.

Generating a compressed network may include a multiplication of the plurality of weights and/or the bias of each trained network component of the trained neural network with an associated compressing factor of the compressing map. Thus, in combination with the regularization term of the ninth example, an increased number of the plurality of weights and/or bias of the compressed network have a value of "0" or a value close to "0". This has the effect that the compressed network has a lower computational cost and calculations performed by the compressed network require less time. A compressed network generated using a compressing map as described above has the effect that the compressed network does not have a predetermined network architecture but rather a task-specific efficient network architecture. The feature mentioned in this paragraph in combination with the seventeenth example and the eighteenth example provides a nineteenth example in accordance with the present invention.

Each trained network component may further include a batch normalization. Each weight of the plurality of weights of each trained network component may be normalized before multiplying with the associated compressing factor of the compressing map. The features mentioned in this paragraph in combination with the nineteenth example provide a twentieth example in accordance with the present invention.

A bias offset may be added to the bias of each trained network component before multiplying with the associated compressing factor of the compressing map. The bias offset may be determined using a batch variance, a batch mean, a batch compressing coefficient, and a batch offset of the batch normalization. The features mentioned in this paragraph in combination with the twentieth example provide a twenty-first example in accordance with the present invention.

The first training data and/or the second training data are selected from a plurality of data. The plurality of data may include a plurality of tasks and the first training data and/or the second training data may include at least one task of the plurality of tasks. The first training data may be different of the second training data. The features mentioned in this paragraph in combination with any one of the first example to the twenty-first example provide a twenty-second example in accordance with the present invention.

The first training data and/or the second training data may be selected from the plurality of data using a selection model. The selection model may be or may include a neural network. The features mentioned in this paragraph in combination with the twenty-second example provide a twenty-third example in accordance with the present invention.

The first training data and/or the second training data may include one of the following data types: digital images, time sequences, or point clouds. The data type of the first training data may corresponds to the data type of the second training data. The features mentioned in this paragraph in combination with any one of the first example to the twenty-third example provide a twenty-fourth example in accordance with the present invention.

The model may include a neural network. The feature mentioned in this paragraph in combination with any one of the first example to the twenty-fourth example provides a twenty-fifth example in accordance with the present invention.

The first model portion and/or the second model portion may be a neural network. The features mentioned in this paragraph in combination with the twenty-fifth example provide a twenty-sixth example in accordance with the present invention.

The trained network components may be neurons of the trained neural network. The feature mentioned in this paragraph in combination with any one of the first example to the twenty-sixth example provides a twenty-seventh example in accordance with the present invention.

The method may further include the compressed network generated by the trained model generating digital output data for digital input data. The feature mentioned in this paragraph in combination with any one of the first example to the twenty-seventh example provides a twenty-eighth example in accordance with the present invention.

The method may further include a sensor detecting the digital input data. The sensor may be a camera sensor, a video sensor, a radar sensor, a LiDAR sensor, an ultrasonic sensor, a motion sensor, or a thermal sensor. The features mentioned in this paragraph in combination the twenty-eighth example provide a twenty-ninth example in accordance with the present invention.

The method may further include the compressed network generated by the trained model generating third training data. The method may include training another model using the third training data. The features mentioned in this paragraph in combination with any one of the first example to the twenty-ninth example provide a thirtieth example in accordance with the present invention.

At least a part of the model may be implemented by one or more processors. The feature mentioned in this paragraph in combination with any one of the first example to the thirtieth example provides a thirty-first example in accordance with the present invention.

An example computer program product may store program instructions configured to, if executed, perform the method of any one of the first example to the thirty-first example. In this example, the computer program product may involve a non-transitory computer-readable memory medium on which is stored a computer program of a computer-implemented model generating a compressed network from a trained neural network. The feature mentioned in this paragraph provides a thirty-second example in accordance with the present invention.

An example device may include a compressed network generated by the model trained by the method of any one of the first example to the thirty-first example. The device mentioned in this paragraph provides a thirty-fourth example in accordance with the present invention.

An example system may include a device of the thirty-fourth example, wherein the device may be configured to process digital input data. The system may further include at last one sensor.

The sensor may be configured to provide the digital input data for the device. The system mentioned in this paragraph provides a thirty-fifth example in accordance with the present invention.

An example vehicle may include at least one sensor. The at least one sensor may be configured to provide digital input data. The vehicle may further include a driving assistance system. The driving assistance system may include a compressed network generated by the model trained by the method of any one of the first example to the thirty-first example. The compressed network may be configured to provide digital output data for the digital input data. The driving assistance system may be configured to control the vehicle using the digital output data.

The vehicle mentioned in this paragraph provides a thirty-sixth example in accordance with the present invention.

Various embodiments of the present invention are described with reference to the figures.

DETAILED DESCRIPTION OF EXAMPLE EMBODIMENTS

In an embodiment of the present invention, a "circuit" may be understood as any kind of a logic implementing entity, which may be hardware, software, firmware, or any combination thereof. Thus, in an embodiment, a "circuit" may be a hard-wired logic circuit or a programmable logic circuit such as a programmable processor, e.g., a microprocessor (e.g., a Complex Instruction Set Computer (CISC) processor or a Reduced Instruction Set Computer (RISC) processor). A "circuit" may also be software being implemented or executed by a processor, e.g., any kind of computer program, e.g., a computer program using a virtual machine code such as, e.g., Java. Any other kind of implementation of the respective functions which will be described in more detail below may also be understood as a "circuit" in accordance with an alternative embodiment.

Neural networks are applied for many applications and may be trained to perform multiple tasks. However, this leads for example to a high computational cost. In many applications or situations, only some tasks of the multiple tasks the neural network was trained for are necessary. Illustratively, a model is trained to generate a compressed network from a trained network, wherein the compressed network is capable to perform at least one task of the multiple tasks with lower computational cost.

Figure 1:
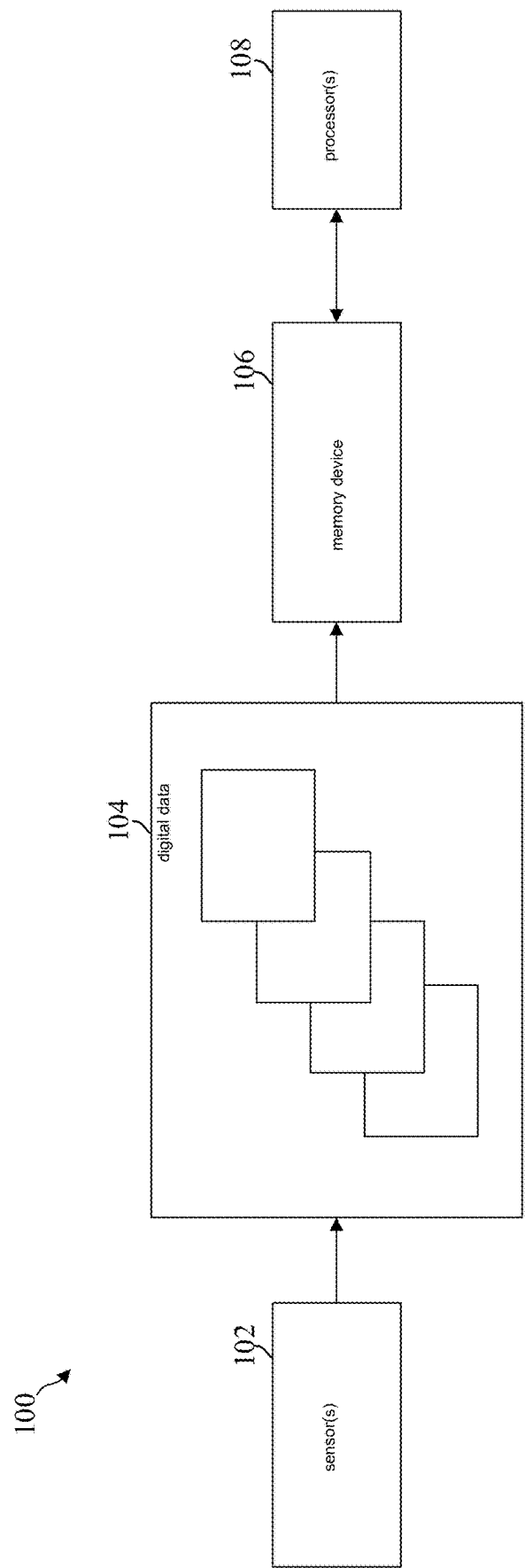
FIG. 1 show a device according to various example embodiments of the present invention.

FIG. 1 shows a device 100 according to various example embodiments of the present invention. The device 100 may include one or more sensors 102. The sensor 102 may be configured to provide (digital) data 104. The sensor 102 may be any kind of sensor, which is capable of providing (digital) data, for example an imaging sensor, such as a camera sensor or a video sensor, a radar sensor, a LiDAR sensor, an ultrasonic sensor, a motion sensor, a thermal sensor, etc. The plurality of sensors may be of the same type of sensor or of different sensor types. The device 100 may further include a memory device 106. The memory device 106 may include a memory which is for example used in the processing carried out by a processor. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory). The memory device 106 may be configured to store the digital data 104 provided by the one or more sensors 102. The device 100 may further include at least one processor 108. The at least one processor 108 may be any kind of circuit, i.e., any kind of logic implementing entity, as described above. In various embodiments, the processor 108 may be configured to process the digital data 104.

In the following, example embodiments will be described based on digital images as digital data 104. It is noted that digital data of any data type may be used, such as time sequences or point clouds.

Figure 2:
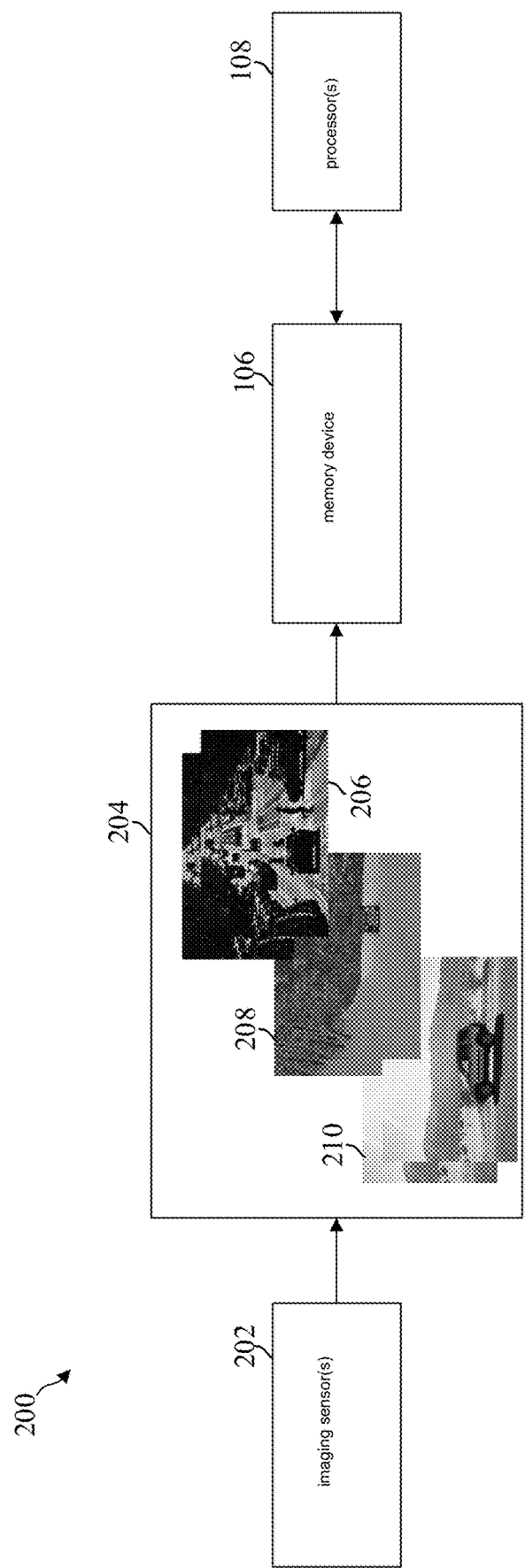
FIG. 2 show an imaging device according to various example embodiments of the present invention.

FIG. 2 shows an imaging device 200 according to various example embodiments of the present invention. The imaging device 200 may include one or more imaging sensors 202. The imaging sensor 202 may be configured to provide a plurality of digital images 204. The plurality of digital images 204 may include a plurality of tasks. In other words, each digital image of the plurality of digital images 204 may be associated to a task of the plurality of tasks. For example, the plurality of digital images 204 may include a plurality of first digital images 206 associated to a first task, may include a plurality of second digital images 208 associated to a second task, and may include a plurality of third digital images 210 associated to a third task, wherein each task may be different of any other task of the plurality of tasks. Each digital image of the plurality of digital images 204 may be associated to a class of a plurality of classes and at least one class of the plurality of classes may be associated to a task of the plurality of tasks. Illustratively, each task of the plurality of tasks may include more than one class of the plurality of classes. By way of example, for autonomous driving, a task of the plurality of tasks may be autonomous driving in a city, wherein the associated classes may be street, pedestrians, buildings, sky, trees, road signs etc., or a task of the plurality of tasks may be autonomous driving in a country-side, wherein the associated classes may be main road, pedestrians, animals, sky, trees, road signs etc. The sensor 102 may be any kind of sensor, which is capable of providing (digital) data, for example an imaging sensor, such as a camera sensor or a video sensor, a radar sensor, a LiDAR sensor, an ultrasonic sensor, a motion sensor, a thermal sensor, etc. The plurality of sensors may be of the same type of sensor or of different sensor types. The device 200 may further include the memory device 106 to store the plurality of digital images 204. The device 200 may further include at least one processor 108. The processor 108 may be configured to process the plurality of digital images 204.

Figure 3:
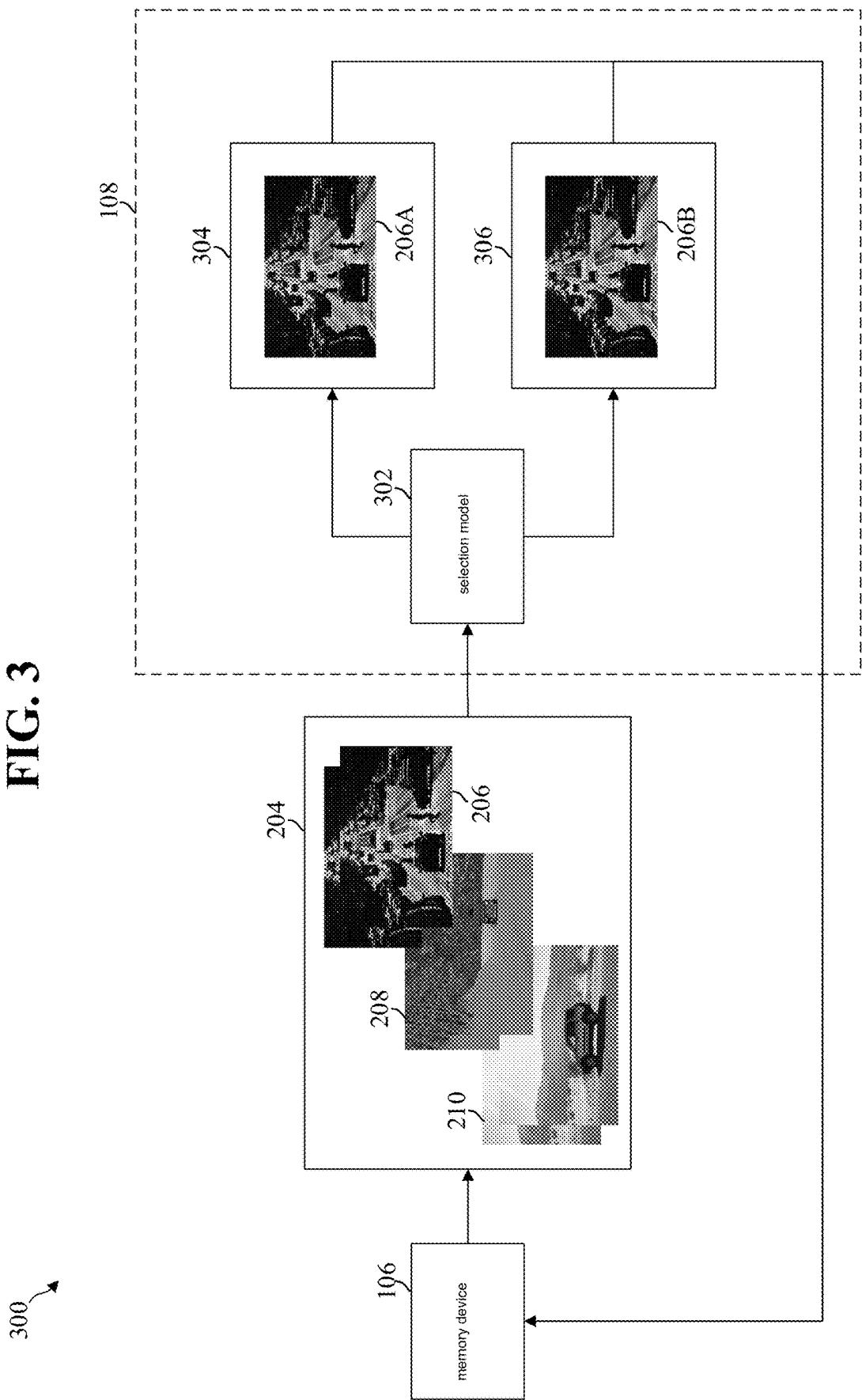
FIG. 3 shows a processing system for selecting training data according to various example embodiments of the present invention.

FIG. 3 shows a processing system 300 for selecting training data according to various example embodiments of the present invention. The processing system 300 may include the memory device 106. The memory device 106 may store the plurality of digital images 204, for example including the plurality of first digital images 206, the plurality of second digital images 208, and the plurality of third digital images 210. The processing system 300 may further include the at least one processor 108. The processor 108 may be configured to process the plurality of digital images 204. The processor 108 may implement at least a part of a trained neural network, wherein the trained neural network may be configured to process the plurality of digital images 204. In other words, the trained neural network may have been trained to provide output data for the plurality of digital images 204. The processor 108 may be configured to implement at least a part of a selection model 302. The selection model 302 may be a neural network. The selection model 302 may be configured to process the plurality of digital images 204. The selection model 302 may be configured to select first training data 304 from the plurality of digital images 204. The first training data 304 may include any number of digital images. The first training data 304 may include digital images associated to at least one task of the plurality of tasks of the plurality of digital images 204, wherein each task may include at least one class of a plurality of classes. The first training data 304 may include at least one digital image 206A of the plurality of first digital images 206 associated to the first task, for example a first part of the plurality of first digital images 206. The selection model 302 may be further configured to select second training data 306 from the plurality of digital images 204. The second training data 306 may include any number of digital images. The second training data 306 may include digital images associated to the at least one task of the first training data 304. The second training data 306 may include at least one digital image 206B of the plurality of first digital images 206 associated to the first task, for example a second part of the plurality of first digital images 206, wherein the second part of the plurality of first digital images 206 may be different of the first part of the plurality of first digital images 206. Illustratively, the selection model 302 may select several digital images from the plurality of digital images 204 associated to at least one task as first training data 304 and may select several digital images from the plurality of digital images 204 associated to the at least one task as second training data 306, wherein the digital images of the first training data 304 are different of the digital images of the second training data 306. In other words, the plurality of digital images 204 may represent data for a plurality of tasks, including a plurality of classes, wherein the trained neural network may be configured to perform the plurality of tasks, and wherein the first training data 304 and/or the second training data 306 may represent at least one task of the plurality of tasks. Illustratively, the first training data 304 and/or the second training data 306 describe the at least one task of the plurality of tasks.

Figure 4:
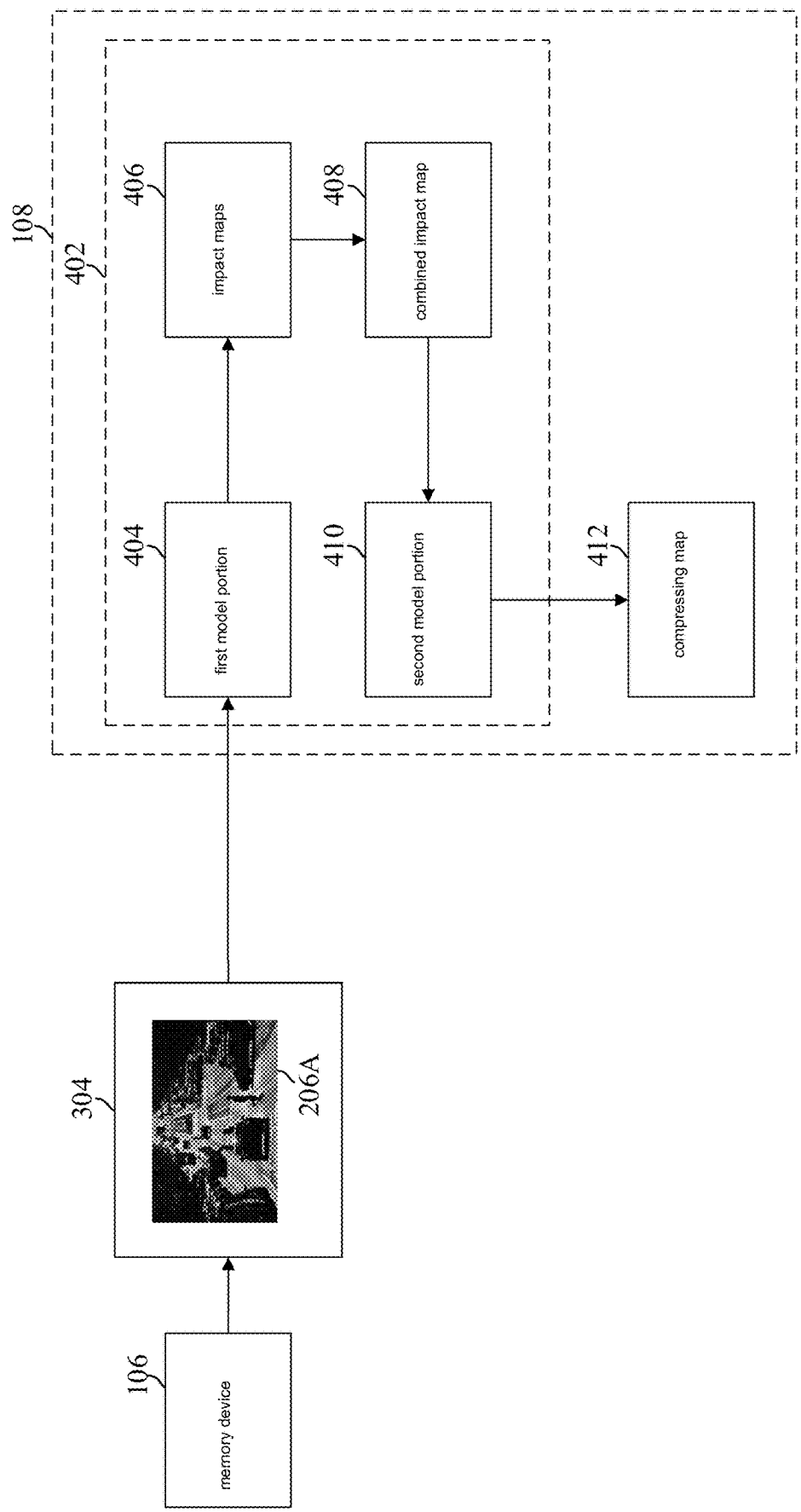
FIG. 4 shows a processing system for generating a compressing map according to various example embodiments of the present invention.
Figure 5:
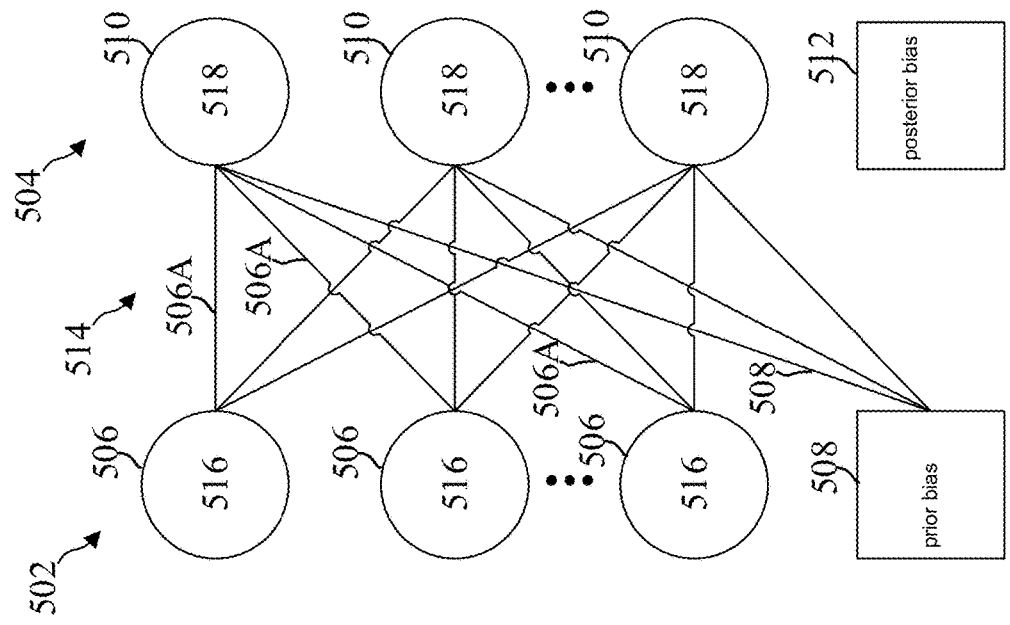
FIG. 5 shows model components according to various example embodiments of the present invention.

FIG. 4 shows a processing system 400 for generating a compressing map according to various example embodiments of the present invention. The processing system 400 may include the memory device 106. The memory device 106 may store the first training data 304. The processing system 400 may further include the at least one processor 108. The processor 108 may be configured to process the first training data 304. The processor 108 may be configured to implement at least a part of a model 402. The model 402 may include a first model portion 404. The first model portion 404 may be configured to process the first training data 304. The first model portion 404 may be configured to generate a plurality of impact maps 406 for the training data 304. In other words, the first model portion 404 may be configured to generate an impact map for each first training datum of the first training data 304. In even other words, the first model portion 404 may be configured to generate an impact map for each digital image, for example the at least one digital image 206A, of the first training data 304. The plurality of impact maps 406 may represent the impact of first model components to first output data in response to the first training data 304. An impact map associated to a digital image of the training data 304 may represent the impact of the first model components to a first output datum of the first output data in response to the associated first training datum. In other words, the first model portion 404 may include first model components for processing data, such as the first training data 304. The first model portion 404 may be a neural network and the first model components may be neurons of the neural network. FIG. 5 shows model components according to various embodiments. The first model portion 404 may include a prior layer 502, wherein the prior layer 502 may include several prior model components 506 and may include a prior bias 508. The first model portion 404 may include a posterior layer 504, wherein the posterior layer 504 may include several posterior model components 510 and may include a posterior bias 512. The prior model components 506 and the posterior model components 510 may include a plurality of connections 514. Each connection of a posterior model component of the several posterior model components 510 may include a weight 506A or a prior bias 508. Each posterior model component may include an activation function. Each prior model component of the several prior model components 506 may provide a prior model component output 516. Each posterior model component may determine a posterior model component output 518. The posterior model component output 518 may be determined using the prior model component outputs 516, the weights 506A, the prior bias 508 and optionally the activation function. An impact map of the plurality of impact maps 406 may include the plurality of first model component outputs for a first training datum, such as the digital image 206A, of the first training data 304.

The first model portion 404 may include at least a part of a trained neural network. The first model components of the first model portion 404 may correspond to trained network components of the trained neural network. In other words, the architecture including the weights, the biases, the activation functions of at least a part of the first model portion 404 may correspond to at least a part of the trained neural network. Illustratively, the first model components of the first model portion 404 may be initialized, i.e., before training the first model portion 404, as at least a part of the trained neural network. The trained neural network may include a first part of trained network components and a second part of trained network components, wherein the first model components may correspond to the first part of trained network components. The first part of the trained network components may provide intermediate output data for the first training data 304 and the second part of the trained network components may provide the first output data for the intermediate output data. In other words, the first model portion 304 may include first model components, wherein the first model components may include at least a part of trained network components of the trained neural network.

Illustratively, the trained neural network includes a plurality of network layers and the first model portion may include a first part of the plurality of network layers. Thus, the output generated by each first model component of the first model components for a first training datum of the first training data 304 may correspond to the output generated by the respective trained network component. In other words, if the trained neural network processes a first training datum, the trained neural network may output the first output data for the first training datum, and each trained network component may include an output, i.e., a trained network component output. Thus, the first model component output of a first model component for a first training datum may represent the importance or impact of the first model component to the first output datum in response to the first training datum. Illustratively, for processing a first training datum each first model component may have a different impact for generating the respective first output datum. In other words, some first model components may have no impact in processing the respective first training datum, i.e., the output of the respective first model components may have the value "0". An impact map may include the plurality of first model component outputs for a first training datum of the first training data 304. Thus, an impact map may represent the impact of the trained neural network components, given by the first model components, to a first output datum of the first output data in response to the associated first training datum.

As shown in FIG. 4, the processor 108 may be further configured to generate a combined impact map 408 for the plurality of impact maps 406. The combined impact map 408 may be generated using a sum or a mean of the plurality of impact maps 406. In other words, each impact map of the plurality of impact maps 406 may include a plurality of first model component outputs and the combined map may be generated by adding, i.e., a sum, or by averaging, i.e., a mean, of the respective first model outputs of each impact map of the plurality of impact maps 406. Thus, generating a combined impact map 408 may be a transformation of the plurality of impact maps 406, wherein the model 402 may include the transformation.

The model 402 may further include a second model portion 410. The second model portion 410 may be a neural network. According to various example embodiments of the present invention, the model 402 is a neural network, i.e., the first model portion 404 and the second model portion 410 are a neural network. The second model portion 410 may be configured to generate a compressing map 412 from the combined impact map 408. Thus, the compressing map 412 may represent the impact of model components of the model to the first output data in response to the first training data 304. The compressing map 412 may include a plurality of compressing factors, wherein each compressing factor of the plurality of compressing factors may be assigned to a trained network component of the trained neural network. Each trained network component may include at least one weight and a bias, and the compressing map 412 may include a compressing factor associated to the respective trained network component, wherein the compressing factor may be a factor to scale or compress the at least one weight and the bias of the respective trained network component.

Figure 6:
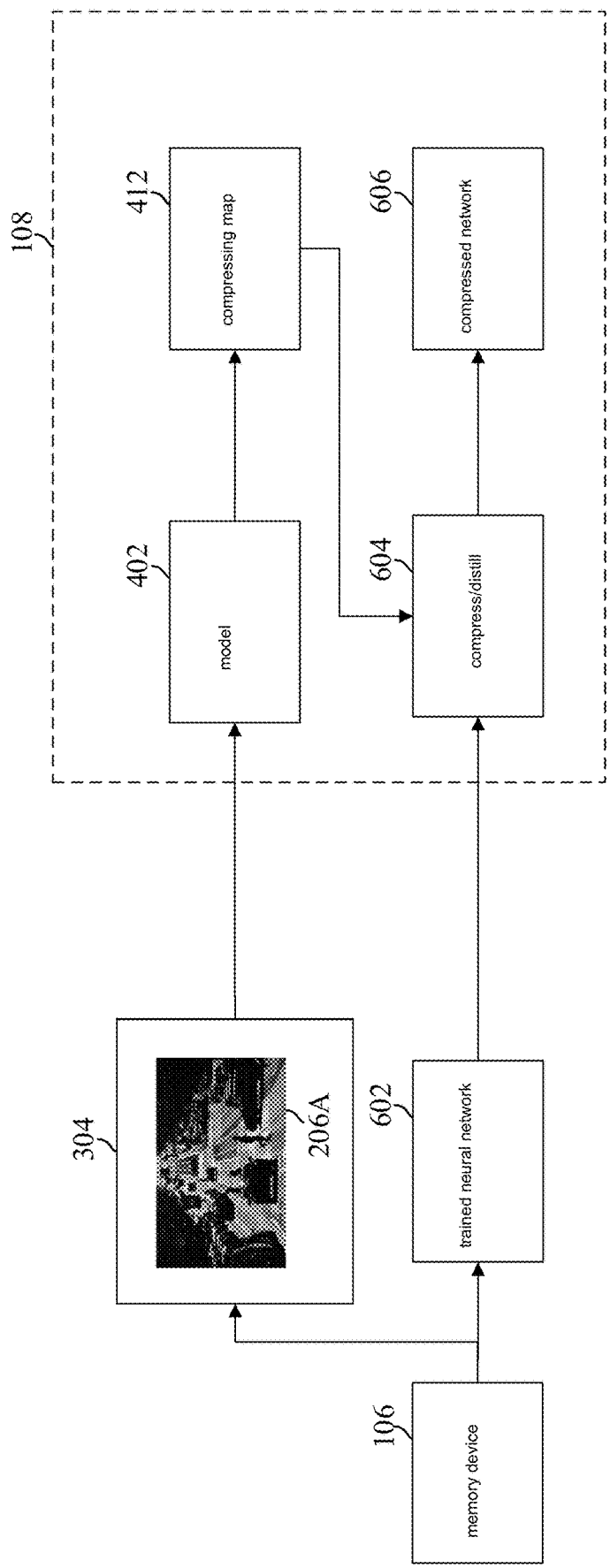
FIG. 6 shows a processing system for generating a compressed network from a trained neural network according to various example embodiments of the present invention.

FIG. 6 shows a processing system 600 for generating a compressed network from a trained neural network according to various example embodiments of the present invention. The processing system 600 may correspond substantially to the processing system 400, wherein the processor 108 is further configured to generate a compressed network 606. The memory device 106 may further store a specification of the trained neural network 602. The specification of the trained neural network 602 may include a plurality of weights and/or a plurality of biases of the trained network components of the trained neural network. The processor 108 may be configured to process the specification of the trained neural network 602. The processor 108 may be configured to scale, for example compress 604 or distill, the specification of the trained neural network 602 using the compressing map 412. In other words, the processor 108 may be configured to scale, for example to compress 604 or distill, the plurality of weights and/or the plurality of biases of the trained network components using the compressing map 412. The processor 108 may be configured to generate a compressed network 606 by compressing 604 the specification of the trained neural network 602 in accordance with the compressing map 412. In other words, the processor 108 may be configured to generate a compressed network 606 by compressing 604 the trained neural network in accordance with the compressing map 412. The trained neural network may be compressed 604 to the compressed network 606 by a multiplication of the compressing map 412 with the specification of the trained neural network 602. In other words, the trained neural network may be compressed 604 by multiplying each weight of the plurality of weights and/or each bias of the plurality of biases of the trained network components with an associated compressing factor of the compressing map 412. As described above, the trained neural network may be trained to perform a plurality of tasks, i.e., to process data of a plurality of classes, and the first training data 304 may represent at least one task of the plurality of tasks, wherein the at least one task may include at least one class, for example a plurality of classes. Thus, the compressing map 412 generated by the model 402 using the first training data 304 may represent the impact of model components, such as the first model components, in response to the first training data 304, and, illustratively, the compressed network 606 generated using the compressing map 412 may be configured to perform the at least one task of the plurality of tasks. In other words, the first training data 304 describe a task description and the task description is a restriction to the trained neural network.

Each trained network component may further include or may be associated to a batch normalization and a modified weight may be determined for each weight of the plurality of weights of the trained network components before multiplying with the associated compressing factor of the compressing map 412.

A modified weight ($W_m$) may be determined by equation (1):

$$W_m = \text{diag}(c) W \quad (1)$$

wherein W is a respective weight and wherein c is determined by $$c = \frac{\gamma}{\sigma^2},$$

wherein $\gamma$ is the batch compressing coefficient of the batch normalization layer and $\sigma^2$ is the batch variance of the batch normalization layer.

A bias offset ($b_{offset}$) may be added to the bias of each trained network component before multiplying with the associated compressing factor of the compressing map 412. The bias offset may be determined by equation (2):

$$b_{offset} = \beta - \frac{\mu \gamma}{\sigma^2} \quad (2)$$

wherein $\mu$ is the batch mean of the batch normalization layer, and wherein $\beta$ is the batch offset of the batch normalization layer.

The plurality of modified weights may be normalized before multiplying with the associated compressing factor of the compressing map 412. The plurality of modified weights may be normalized by predicting the norm of each row of $W_m$.

Generating the compressed network 606 using the compressing map 412 may change the batch statistics and thus making training the model 402 more difficult; determining a modified weight, as bias offset, and/or normalizing the modified weights has the effect that the above problem is circumvented.

Figure 7:
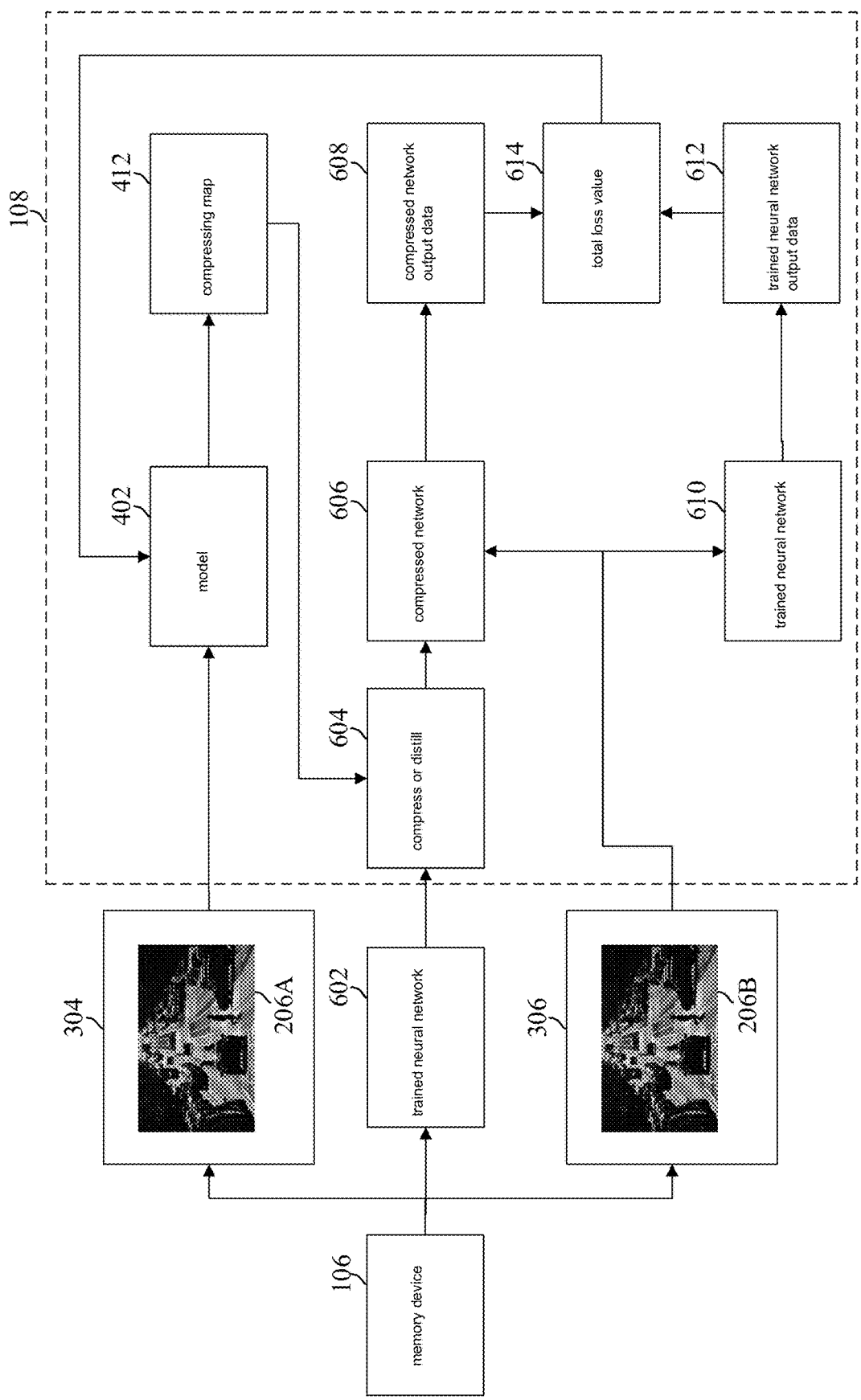
FIG. 7 shows a processing system for training a model according to various example embodiments of the present invention.

FIG. 7 shows a processing system 700 for training a model according to various example embodiments of the present invention. The processing system 700 may correspond substantially to the processing system 600, wherein the memory device may further store the second training data 306, including for example the digital image 206B. The processor 108 may be configured to implement at least a part of the compressed network 606. The compressed network 606 may be configured to process the second training data 306 and may be configured to generate compressed network output data 608 in response to the second training data 306. The processor 108 may be further configured to implement at least a part of the trained neural network 610. The trained neural network 610 may be configured to process the second training data 306 and may be configured to generate trained network output data 612 in response to the second training data 306. The processor 108 may be configured to train the model 402 by comparing the trained network output 612 with the compressed network output 608. The model 402 may be trained by training the first model portion 404 and/or the second model portion 410. The processor 108 may be configured to determine a loss value by comparing each trained network output datum of the trained network output data 612 with the associated compressed network output datum of the compressed network output data 608. For example, the trained neural network 610 may be a segmentation network and may generate segmentation images for the digital images of the second training data 306 and the compressed network 606 may be a segmentation network and may generate segmentation images for the digital images of the second training data 306, and the processor 108 may be configured to compare each segmentation image generated by the trained neural network 610 with the segmentation image generated by the compressed network 606 and may be configured to determine a loss value based on the comparison. A loss value of the plurality of loss values may be determined using a loss function. The loss function may be a cross-entropy loss function. The processor 108 may be further configured to determine a total loss value 614 for the plurality of loss values. The total loss value 614 may be determined by a sum of the plurality of loss values and a regularization term. The regularization term may be any term that prefers sparse solutions, such as an $L_1$ or an $L_{0.5}$ loss. The first model portion 404 and/or the second model portion 410 may be trained using the total loss value 614. The first model portion 404 and/or the second model portion 410 may be trained by reducing, for example minimizing, the total loss value 614.

The total loss value 614 may be determined by equation (3):

$$\mathcal{L}_{(S,T,Y,\phi,\theta)} = \Sigma_{i=1}^{M_t} \mathcal{L}(f_\theta(T_i|g_\phi(S)),Y_i) + \mathcal{R}(g_\phi(S)) \quad (3)$$

wherein S are the first training data 304 and T are the second training data 306, wherein $f_\theta$ is the trained neural network 610 and $g_\phi(S)$ is the compressed network 606 generated using the first training data 304 (S), wherein Y are the trained network output data 612, and wherein $\mathcal{R}(\cdot)$ is the regularization term.

Illustratively, due to the regularization term, the trained network components, such as associated weights, are not only scaled but most compressing factors of the compressing map 412 are equal to the value "0" or close to the value "0". This has the effect that multiple weights associated to the trained neural network 610 are omitted implying that the trained neural network is compressed to a compressed network 606.

Figure 8:
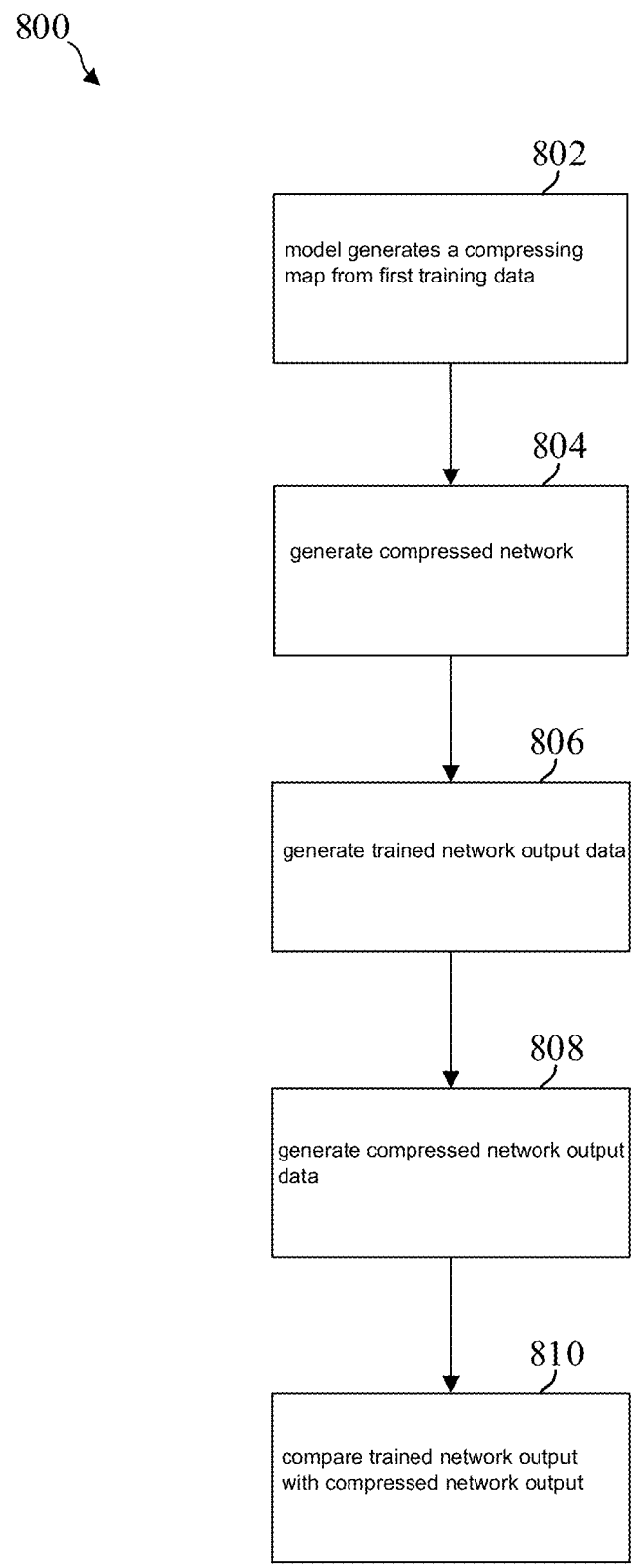
FIG. 8 shows a method of generating a compressed network from a trained neural network according to various example embodiments of the present invention.

FIG. 8 shows a method 800 of generating a compressed network from a trained neural network according to various example embodiments of the present invention. The method 800 may include a model 402 generating a compressing map 412 from first training data 304 (in 802). The compressing map 412 may represent the impact of model components of the model 402 to first output data in response to first training data 304. The method 800 may include generating a compressed network 606 by compressing 604 the trained neural network in accordance with the compressing map 412 (in 804). The method 800 may include the trained neural network 610 generating trained network output data 612 in response to second training data 306 (in 806). The method 800 may include the compressed network 606 generating compressed network output data 608 in response to the second training data 306 (in 808). The method 800 may further include training the model 402 by comparing the trained network output 612 with the compressed network output 608 (in 810).

Figure 9:
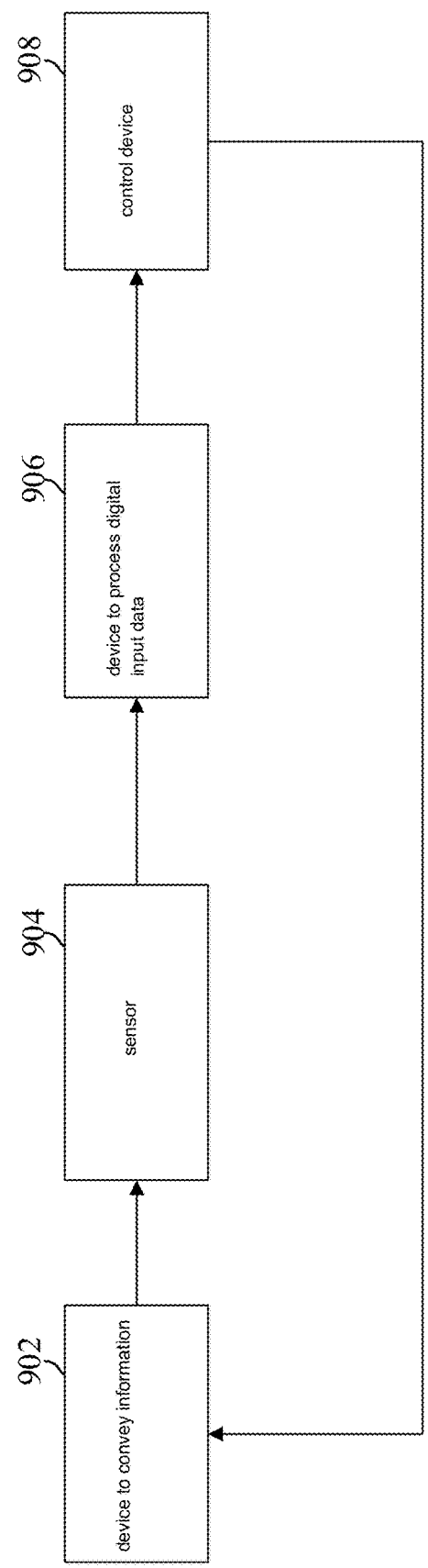
FIG. 9 shows a system including a compressed network according to various example embodiments of the present invention.

FIG. 9 shows a system 900 including a segmentation model according to various example embodiments of the present invention. The system 900 may include a first device 902. The first device 902 may be a computer-controlled device like a robot, a vehicle, a domestic appliance, a power tool, a manufacturing machine, a personal assistant, an access control system etc. The first device 902 may be a device for conveying information like a surveillance system or a medical (imaging) system. The system 900 may be a defect detection system and the first device 902 may be an assembly belt moving parts. The system 900 may be a system for autonomous driving and the first device 902 may be a vehicle. The system 900 may be an embedded system. The system 900 may be real-time and/or safety-critical system, i.e., a system with time and computational constraints. The system 900 may further include a sensor 904. The sensor 904 may be configured to detect digital input data, such as digital images, associated to the first device 902, for example digital images showing the surrounding of a vehicle or showing parts on an assembly belt.

The system 900 may include a second device 906. The second device 906 may be configured to process the digital input data provided by the sensor 904. The second device 906 may include a compressed network, such as the compressed network 606. The compressed network 606 may be generated from a trained neural network using the method 800 of generating a compressed network from a trained neural network. The trained neural network may be configured to perform a plurality of tasks and the compressed network 606 may be configured to perform at least one task of the plurality of tasks. In other words, the trained neural network may be configured to process digital data associated to a plurality of tasks, including a plurality of classes, and the compressed network 606 may be configured to process digital input data associated to at least one task of the plurality of tasks, wherein the at least one task may include at least one class, for example a plurality of classes. Illustratively, the digital output data generated by the compressed network 606 for the digital input data may correspond substantially to digital output data, which would be generated by the trained neural network for the digital input data. The system 900 may further include a control device 908. The control device 908 may be configured to control the first device 902 using the digital output data provided by the second device 906.

Figure 10:
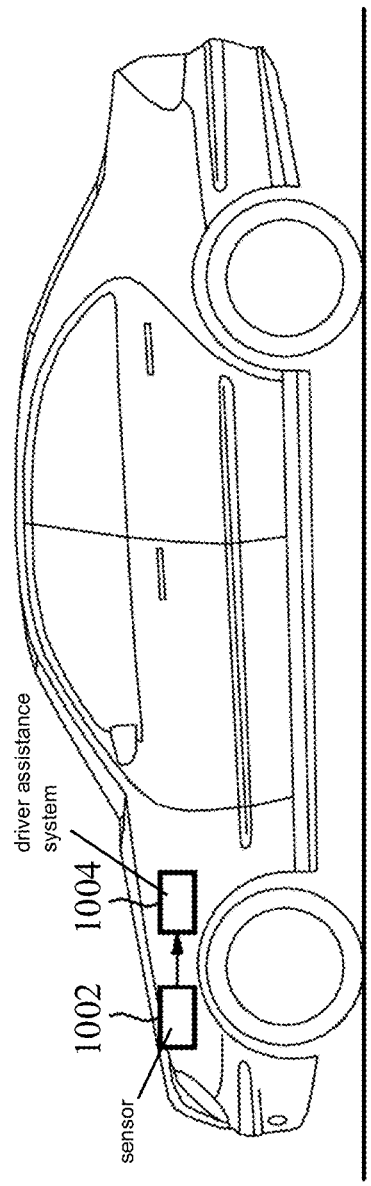
FIG. 10 shows a vehicle according to various example embodiments of the present invention.

FIG. 10 shows a vehicle 1000 according to various example embodiments of the present invention. The vehicle 1000 may be a vehicle with a combustion engine, an electric vehicle, a hybrid vehicle, or a combination thereof. Further, the vehicle 1000 may be a car, a truck, a ship, a drone, an aircraft or the like. The vehicle 1000 may include at least one sensor 1002. The sensor 1002 may be any kind of sensor, which is capable of providing (digital) input data, for example an imaging sensor, such as a camera sensor or a video sensor, a radar sensor, a LiDAR sensor, an ultrasonic sensor, a motion sensor, a thermal sensor, etc. The vehicle 1000 may include a driving assistance system 1004. The driving assistance system 1004 may include the memory device 106. The driving assistance system 1004 may further include the at least one processor 108. The processor 108 may implement a compressed network 606, wherein the compressed network 606 may be generated by a model 402 from a trained neural network by the method 800. The compressed network 606 may be configured to provide digital output data for the digital input data. The driving assistance system 1004 may be configured to control the vehicle 1000 using the digital output data. In other words, the driving assistance system 1004 may be configured to process the digital output data generated by the compressed network 606 and to output a control command to one or more actuators of the vehicle 1000 using the generated digital output data. Thus, the driving assistance system 1004 may influence the current vehicle handling using the digital output data, for example the current vehicle handling may be maintained or changed. Changing the current vehicle handling may be for example an intervention in the vehicle handling due to safety reasons, such as an emergency braking.

What is claimed is:

1. A method of a computer-implemented model generating a compressed network from a trained neural network, the method comprising the following steps:

generating, by a first model portion of the model, an impact map representing an impact of model components for each first output datum of first output data in response to an associated first training datum, wherein each generated impact map includes, for each of the model components, an impact in processing the associated first training datum;
generating a combined impact map using each of the generated impact maps;
generating, by a second model portion of the model, a compressing map from the combined impact map;
generating a compressed network by compressing the trained neural network in accordance with the compressing map, wherein the generating of the compressed network includes deleting network components from the trained neural network in accordance with the compressing map when a corresponding value in the compressing map meets a predefined deleting criterion;
generating, by the trained neural network, trained network output data in response to second training data;
generating, by the compressed network, compressed network output data in response to the second training data; and
training the model by comparing the trained network output data with the compressed network output data.

2. The method of claim 1, wherein the training of the model includes training the first model portion and/or training the second model portion by comparing the trained network output data with the compressed network output data.

3. The method of claim 1, wherein the predefined deleting criterion is met when the corresponding value in the compressing map is below a predefined threshold value.

4. The method of claim 1, wherein the training of the model includes training the model to increase a total compression by reducing a sum of each value of the compressing map.

5. The method of claim 1, wherein the first output data are generated by the trained neural network for the first training data.

6. The method of claim 1, wherein the trained neural network is trained to provide first output data for first input data of a plurality of tasks, and wherein the compressed network provides second output data for second input data of at least one task of the plurality of tasks.

7. The method of claim 6, wherein the first training data and/or the second training data are selected from a plurality of data using a selection model.

8. The method of claim 1, further comprising the following steps:
generating, by the compressed network generated by the trained model, third training data in response to input data; and
training another model using the third training data.

9. A non-transitory computer-readable memory medium on which is stored a computer program of a computer-implemented model generating a compressed network from a trained neural network, the computer program, when executed by a computer, causing the computer to perform the following steps:
generating, by a first model portion of the model, an impact map representing an impact of model components for each first output datum of first output data in response to an associated first training datum, wherein each generated impact map includes, for each of the model components, an impact in processing the associated first training datum;
generating a combined impact map using each of the generated impact maps;
generating, by a second model portion of the model, a compressing map from the combined impact map;
generating a compressed network by compressing the trained neural network in accordance with the compressing map, wherein the generating of the compressed network includes deleting network components from the trained neural network in accordance with the compressing map when a corresponding value in the compressing map meets a predefined deleting criterion;
generating, by the trained neural network, trained network output data in response to second training data;
generating, by the compressed network, compressed network output data in response to the second training data; and
training the model by comparing the trained network output data with the compressed network output data.

10. A system, comprising:
a device including a compressed network generated by a trained model, the device configured to process digital input data; and
at least one sensor configured to provide digital input data for the device;
wherein the trained model is trained by
generating, by a first model portion of the model, an impact map representing an impact of model components for each first output datum of first output data in response to an associated first training datum, wherein each generated impact map includes, for each of the model components, an impact in processing the associated first training datum;
generating a combined impact map using each of the generated impact maps;
generating, by a second model portion of the model, a compressing map from the combined impact map;
generating a compressed network by compressing a trained neural network in accordance with the compressing map, wherein the generating of the compressed network includes deleting network components from the trained neural network in accordance with the compressing map when a corresponding value in the compressing map meets a predefined deleting criterion;
generating, by the trained neural network, trained network output data in response to second training data;
generating, by the compressed network, compressed network output data in response to the second training data; and
training the model by comparing the trained network output data with the compressed network output data.

11. A vehicle, comprising:
at least one sensor configured to provide digital input data; and
a driving assistance system including a compressed network generated from a trained neural network using a trained model, wherein the trained neural network is configured to process the digital input data, wherein the compressed network is configured to provide digital output data for the digital input data provided by the at least one sensor, and wherein the driving assistance system is configured to control the vehicle using the digital output data, and wherein the trained model is trained by:
generating, by a first model portion of the model, an impact map representing an impact of model components for each first output datum of first output data in response to an associated first training datum, wherein each generated impact map includes, for each of the model components, an impact in processing the associated first training datum;

generating a combined impact map using each of the generated impact maps;

generating, by a second model portion of the model, a compressing map from the combined impact map;

generating a compressed network by compressing the trained neural network in accordance with the compressing map, wherein the generating of the compressed network includes deleting network components from the trained neural network in accordance with the compressing map when a corresponding value in the compressing map meets a predefined deleting criterion;

generating, by the trained neural network, trained network output data in response to second training data;

generating, by the compressed network, compressed network output data in response to the second training data; and training the model by comparing the trained network output data with the compressed network output data.

* * * * *